(12) United States Patent
Hung et al.

(10) Patent No.: US 7,605,986 B2
(45) Date of Patent: Oct. 20, 2009

(54) ZOOM LENS

(75) Inventors: Chao-Yu Hung, Miao-Li Hsien (TW); Jyh-Long Chern, Miao-Li Hsien (TW)

(73) Assignee: Foxsemicon Integrated Technology, Inc., Chu-Nan, Miao-Li Hsien (TW)

( * ) Notice: Subject to any disclaimer, the term of this patent is extended or adjusted under 35 U.S.C. 154(b) by 0 days.

(21) Appl. No.: 12/343,803

(22) Filed: Dec. 24, 2008

(65) Prior Publication Data

US 2009/0168197 A1    Jul. 2, 2009

(30) Foreign Application Priority Data

Dec. 28, 2007    (CN) .................... 2007 1 0203509

(51) Int. Cl.
*G02B 15/14*    (2006.01)
*G02B 13/18*    (2006.01)

(52) U.S. Cl. .................. 359/682; 359/689; 359/716

(58) Field of Classification Search ......... 359/680–682, 359/689, 716
See application file for complete search history.

(56) References Cited

U.S. PATENT DOCUMENTS

| | | | | |
|---|---|---|---|---|
| 7,016,119 B2* | 3/2006 | Saori | ............ | 359/682 |
| 7,019,912 B2* | 3/2006 | Saori | ............ | 359/682 |
| 7,085,067 B2* | 8/2006 | Enomoto | ............ | 359/680 |

* cited by examiner

*Primary Examiner*—Scott J Sugarman
(74) *Attorney, Agent, or Firm*—Clifford O. Chi

(57) ABSTRACT

An exemplary zoom lens comprises, in order from an object side of the zoom lens, a first lens module having a negative refractive power, a second lens module having a positive refractive power and a third lens module having a positive refractive power. When the zoom lens is adjusted from wide-angle to telephoto, the first lens module remain fixed in place, the second group is moved toward the object side thereof along an optical axis so as to perform the zooming, while the third group is moved along the optical axis so as to compensate for any fluctuation of in position of an image on the image plane caused by the movement of the second lens module.

14 Claims, 4 Drawing Sheets

ZOOM LENS

BACKGROUND

1. Technical Field

The present invention generally relates to zoom lenses, particularly, to a zoom lens with compact configuration.

2. Discussion of Related Art

Mobile telephones equipped with cameras having a solid-state image sensor, such as charge couple device (CCD), are very popular. Such mobile phones typically include zoom lenses allowing users to have greater versatility in picture taking. However, zooming function is accomplished by moving lenses along the optical axis of a zoom lens unit, which requires a significant amount of space, thus further reduction in size of the phone is difficult.

Therefore, what is needed is a zoom lens that has a compact configuration.

BRIEF DESCRIPTION OF THE DRAWINGS

Many aspects of the present zoom lens can be better understood with reference to the following drawings. The components in the drawings are not necessarily drawn to scale, the emphasis instead being placed upon clearly illustrating the principles of the present zoom lens. Moreover, in the drawings, like reference numerals designate corresponding parts throughout the several views, wherein.

DETAILED DESCRIPTION OF THE PREFERRED EMBODIMENTS

Reference will now be made to the drawings to describe the embodiments of the present zoom lens, in detail.

Figure 1:
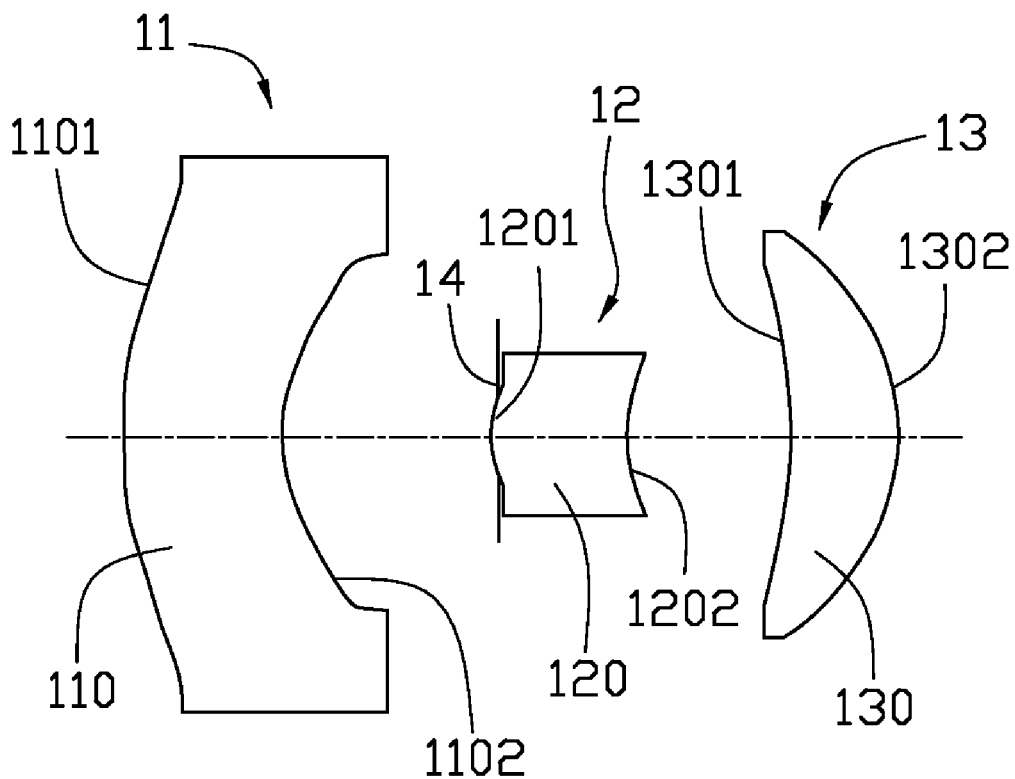
FIG. 1 is a schematic isometric view of a zoom lens, according to a first exemplary embodiment.
Figure 2:
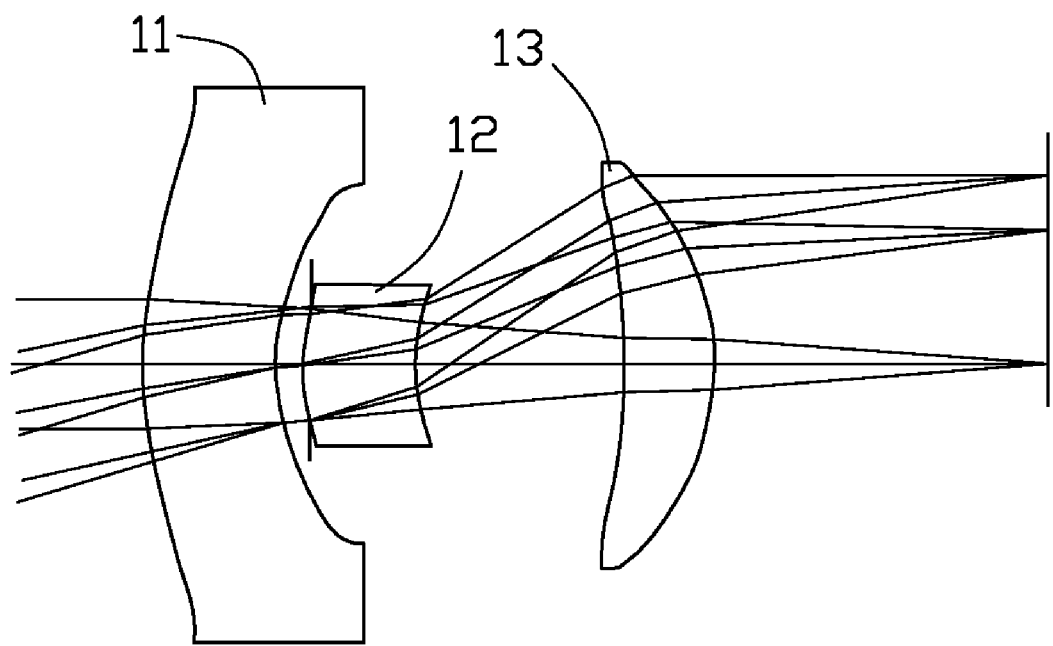
FIG. 2 is a schematic isometric view of the zoom lens in a telephoto position, according to the first exemplary embodiment.
Figure 3:
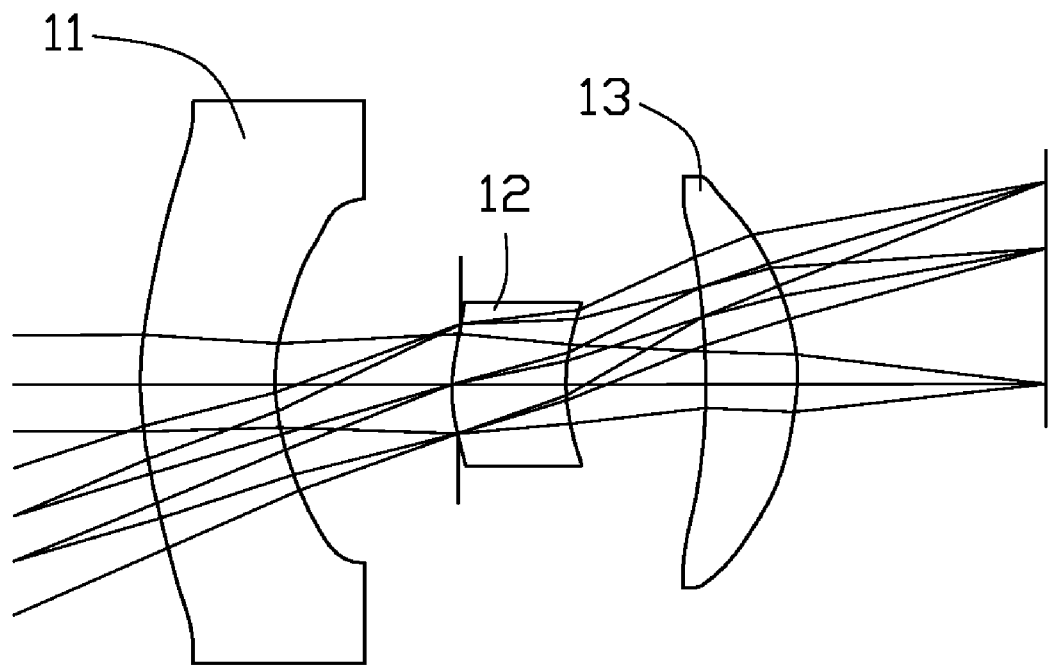
FIG. 3 is a schematic isometric view of the zoom lens when zooming from a wide angle to the telephoto position, according to the first exemplary embodiment.
Figure 4:
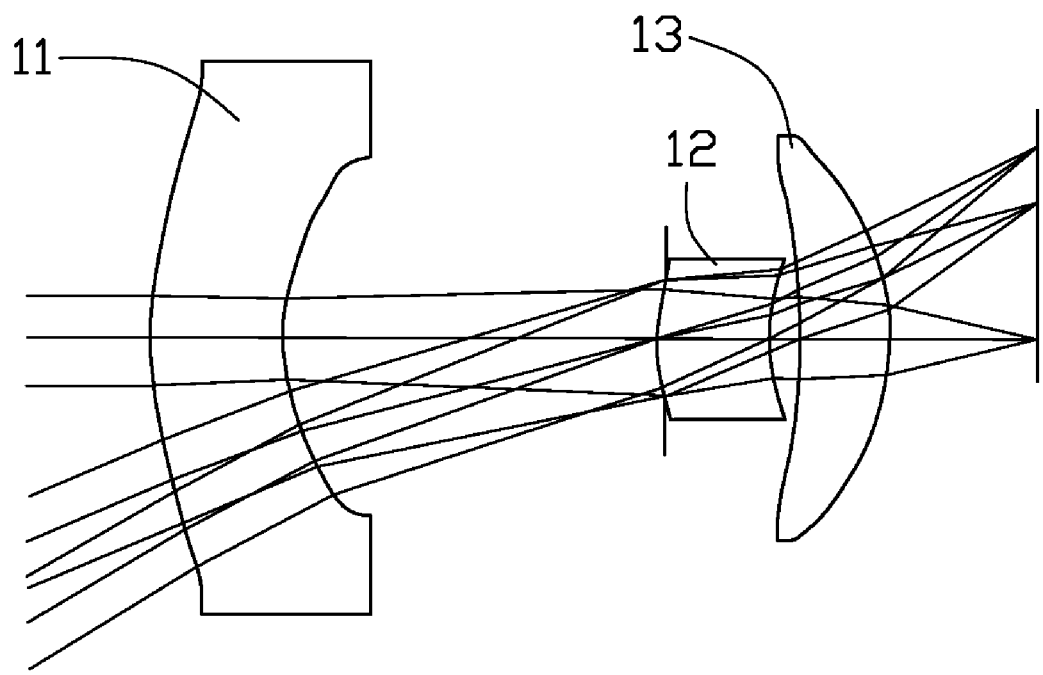
FIG. 4 is a schematic isometric view of the zoom lens in the wide-angle position, according to the first exemplary embodiment.

Referring to FIG. 1, a zoom lens 10 according to a first exemplary embodiment is provided. The zoom lens 10 includes, from an object side of the zoom lens, a first lens module 11 having a negative refractive power, a second lens module 12 having a positive refractive power and a third lens module 13 having a positive refractive power.

The first lens module 11 remain still when the zoom lens 10 is adjusted from wide-angle to telephoto. The first lens module 11 includes a lens 110 having negative refractive power. The first lens module 11 is configured for receiving light from an object. The lens 110 includes two surfaces 1101, 1102. At least one of the surfaces 1101, 1102 is an aspherical surface. The lens 110 can be a polymer lens or a glass lens.

The second lens module 12 is capable of being moved toward the object side along an optical axis of the zoom lens 10 to zoom. The second lens module 12 includes a lens 120 having positive refractive power. The lens 120 includes two surfaces 1201, 1202. At least one of the surfaces 1201, 1202 is an aspherical surface. The lens 120 can be a polymer lens or a glass lens.

The third lens module 13 is capable of being moved along the optical axis to compensate any fluctuation of position of an image on the image plane caused by the movement of the second lens module. The third lens module 13 includes a lens 130 having positive refractive power. The lens 130 includes two surfaces 1301, 1302. At least one of the surfaces 1301, 1302 is an aspherical surface. The lens 130 can be a polymer lens or a glass lens. In this exemplary embodiment, the third lens module 13 includes only one lens.

Furthermore, the zoom lens 10 includes a diaphragm 14 between the first lens module 11 and the second lens module 12. The diaphragm 14 is fixed to the second lens module 12.

The zoom lens 10 satisfies conditions:

$$2.3 < |F_1|/F_W < 2.9; \tag{1}$$

$$1 < |F_2|/F_W < 1.5; \tag{2}$$

$$0.2 < |F_{BW}|/TTL < 0.5; \tag{3}$$

$$2 < TTL/y < 4.1; \tag{4}$$

$$2.5 < TTL/D_{2W} < 4.5; \tag{5}$$

wherein $F_1$ represents a focal length of the first lens module, $F_W$ represents a focal length of the zoom lens 10 in the wide-angle position, $F_2$ represents a focal length of the second lens module, $F_{BW}$ is a back focal length of the zoom lens 10 in the wide-angle position, y represents an image plane height of the zoom lens 10, TTL represents a full length of the zoom lens 10, $D_{2W}$ represents a distance between the first lens module and the second lens module in the wide-angle position.

Each aspherical surface of the lenses of the first lens module 11, the second lens module 12 and the third lens module 13 satisfy conditions:

$$z = \frac{ch^2}{1 + \sqrt{1 - (k+1)c^2h^2}} + A_4h^4 + A_6h^6 + A_8h^8 + A_{10}h^{10}; \tag{6}$$

wherein h represents a height of the lens; z represents an offset of the position point that has a height of "h", relative to the central optical axis; k represents a conic constant; c=1/r, r represents a curvature radius; $A_4$ represents a four-order aspherical coefficient; $A_6$ represents a six-order aspherical coefficient; $A_8$ represents an eight-order aspherical coefficient; and $A_{10}$ represents a ten-order aspherical coefficient.

Following tables show numerical data on the zoom lens 10 and the aspherical surfaces of the lenses of each group, in an exemplary embodiment.

| Surface No. | Curvature Radius (mm) | Thickness (mm) | Refractive Index (Nd) | Abbe Number (Vd) |
|---|---|---|---|---|
| 1 | 2.803035 | 1.15 | 1.53 | 56 |
| 2 | 1.370453 | 0.09-1.49-2.38 | | |
| 3 | Stop | 0.0 | | |
| 4 | 1.060688 | 0.97 | 1.53 | 56 |
| 5 | 1.908257 | 2.54-1.16-0.27 | | |
| 6 | -4.893895 | 0.77 | 1.53 | 56 |
| 7 | -1.671509 | 2.07 | | |

| Surface No. | Conic Constant | $A_4$ | $A_6$ | $A_8$ | $A_{10}$ |
|---|---|---|---|---|---|
| 1 | 0 | −0.02136 | −0.008823 | 0.0046426 | −0.0006526 |
| 2 | 0 | −0.08759 | −0.092854 | 0.101525 | −0.04106 |
| 6 | 0 | 0.10689 | −1.86907 | 11.4358 | −24.1888 |
| 7 | 0 | 0.17044 | 0.43911 | −0.72412 | 0.76027 |
| 9 | 0 | 0.02635 | 0.00099 | −0.002809 | 0.001953 |

Finally, it is to be understood that the above-described embodiments are intended to illustrate rather than limit the invention. Variations may be made to the embodiments without departing from the spirit of the invention as claimed. The above-described embodiment illustrates the scope of the invention but do not restrict the scope of the invention.

What is claimed is:

1. A zoom lens for optical alignment with an image sensor, the zoom lens comprising, from an object side to an image side thereof:

a first lens module having a negative refractive power for being fixed relative to the image sensor, a second lens module having a positive refractive power for being disposed between the first lens module and the image senor and movable toward and away from the first lens module; and a third lens module having a positive refractive power for being disposed between the second lens module and the image sensor and movable toward and away from the second lens module, wherein when the zoom lens is reciprocally zoomable between a wide-angle position where the first lens module is fixed relative to the image sensor, the second and third lens modules are nearest to the first lens module and furthest from the image sensor, and a telephoto position where the first lens module is fixed relative to the image sensor, the second and third lens modules are furthest from the first lens module and furthest from the image sensor, and the zoom lens satisfies following expressions:

$2.3 < |F_1|/F_W < 2.9$;

$1 < |F_2|/F_W < 1.5$;

$0.2 < |F_{BW}|/TTL < 0.5$;

$2 < TTL/y < 4.1$; and $2.5 < TTL/D_{2W} < 4.5$;

wherein $F_1$ represents a focal length of the first lens module, $F_W$ represents a focal length of the zoom lens in the wide-angle position, $F_2$ represents a focal length of the second lens module, $F_{BW}$ represents a back focal length of the zoom lens in the wide-angle position, y represents an image plane height of the zoom lens, TTL represents a full length of the zoom lens, $D_{2W}$ represents a distance between the first lens module and the second lens module in the wide-angle position.

2. The zoom lens according to claim 1, wherein the first lens module comprises a negative refractive power lens having at least an aspheric surface.

3. The zoom lens according to claim 2, wherein the second lens module comprises a positive refractive power lens having at least an aspheric surface.

4. The zoom lens according to claim 3, wherein the third lens module comprises a positive refractive power lens having at least an aspheric surface.

5. The zoom lens according to claim 4, wherein at least one of the first, second and the third lens modules comprises a plurality of polymer lenses or glass lenses.

6. The zoom lens according to claim 4, wherein the aspheric surface of at least one of the first lens module, the second lens module and the third lens module satisfies conditions:

$$z = \frac{ch^2}{1 + \sqrt{1 - (k+1)c^2h^2}} + A_4h^4 + A_6h^6 + A_8h^8 + A_{10}h^{10}$$

wherein h represents a height of the lens; z represents an offset of the point that has a height of "h", relative to the central optical axis; k represents a conic constant; $c = 1/r$, r represents a curvature radius; $A_4$ represents a four-order aspherical coefficient; $A_6$ represents six-order aspherical coefficient; $A_8$ represents an eight-order aspherical coefficient; and $A_{10}$ represents a ten-order aspherical coefficient.

7. The zoom lens according to claim 1, further comprising a diaphragm between the first lens module and second lens module, wherein the diaphragm is fixed to the second lens module.

8. A camera module comprising:

an image sensor; and a zoom lens in optical alignment with the image sensor, the zoom lens comprising, from an object side to an image side thereof:

a first lens module having a negative refractive power, the first lens module fixed relative to the image sensor, a second lens module having a positive refractive power, the second lens module disposed between the first lens module and the image senor and movable toward and away from the first lens module; and a third lens module having a positive refractive power, the third lens module disposed between the second lens module and the image sensor and movable toward and away from the second lens module, wherein when the zoom lens is reciprocally zoomable between a wide-angle position where the first lens module is fixed relative to the image sensor, the second and third lens modules are nearest to the first lens module and furthest from the image sensor, and a telephoto position where the first lens module is fixed relative to the image sensor, the second and third lens modules are furthest from the first lens module and furthest from the image sensor, wherein the zoom lens satisfies following expressions:

$2.3 < |F_1|/F_W < 2.9$;

$1 < |F_2|/F_W < 1.5$;

$0.2 < |F_{BW}|/TTL < 0.5$;

$2 < TTL/y < 4.1$; and $2.5 < TTL/D_{2W} < 4.5$;

wherein $F_1$ represents a focal length of the first lens module, $F_W$ represents a focal length of the zoom lens in the wide-angle position, $F_2$ represents a focal length of the second lens module, $F_{BW}$ represents a back focal length of the zoom lens in the wide-angle position, y represents an image plane height of the zoom lens, TTL represents a full length of the zoom lens, $D_{2W}$ represents a distance between the first lens module and the second lens module in the wide-angle position.

9. The camera module according to claim 8, wherein the first lens module comprises a negative refractive power lens having at least an aspheric surface.

10. The camera module according to claim 9, wherein the second lens module comprises a positive refractive power lens having at least an aspheric surface.

11. The camera module according to claim 10, wherein the third lens module comprises a positive refractive power lens having at least an aspheric surface.

12. The camera module according to claim 11, wherein at least one of the first, second and the third lens modules comprises a plurality of polymer lenses or glass lenses.

13. The camera module according to claim 11, wherein the aspheric surface of at least one of the first lens module, the second lens module and the third lens module satisfies conditions:

$$z = \frac{ch^2}{1 + \sqrt{1-(k+1)c^2h^2}} + A_4h^4 + A_6h^6 + A_8h^8 + A_{10}h^{10}$$

wherein h represents a height of the lens; z represents an offset of the point that has a height of "h", relative to the central optical axis; k represents a conic constant; c=1/r, r represents a curvature radius; $A_4$ represents a four-order aspherical coefficient; $A_6$ represents a six-order aspherical coefficient; $A_8$ represents an eight-order aspherical coefficient; and $A_{10}$ represents a ten-order aspherical coefficient.

14. The camera module according to claim 8, further comprising a diaphragm between the first lens module and second lens module, wherein the diaphragm is fixed to the second lens module.

* * * * *